United States Patent
Schlottmann et al.

(10) Patent No.: US 8,115,700 B2
(45) Date of Patent: Feb. 14, 2012

(54) AUTO-BLANKING SCREEN FOR DEVICES HAVING MULTI-LAYER DISPLAYS

(75) Inventors: Gregory A. Schlottmann, Sparks, NV (US); Jeremy W. Murray, Reno, NV (US)

(73) Assignee: IGT, Reno, NV (US)

( * ) Notice: Subject to any disclaimer, the term of this patent is extended or adjusted under 35 U.S.C. 154(b) by 754 days.

(21) Appl. No.: 11/858,849

(22) Filed: Sep. 20, 2007

(65) Prior Publication Data
US 2009/0079667 A1    Mar. 26, 2009

(51) Int. Cl.
*G09G 5/00*    (2006.01)
(52) U.S. Cl. .................. 345/4; 345/6; 345/419; 345/629
(58) Field of Classification Search .................. 345/4–6, 345/1.1–7, 9, 419, 629–641
See application file for complete search history.

(56) References Cited

U.S. PATENT DOCUMENTS

| | | |
|---|---|---|
| 3,708,219 A | 1/1973 | Forlini et al. |
| 4,333,715 A | 6/1982 | Brooks |
| 4,517,558 A | 5/1985 | Davids |
| 4,607,844 A | 8/1986 | Fullerton |
| 4,621,814 A | 11/1986 | Stepan et al. |
| 4,659,182 A | 4/1987 | Aizawa |
| 4,718,672 A | 1/1988 | Okada |
| 4,911,449 A | 3/1990 | Dickinson et al. |
| 4,912,548 A | 3/1990 | Shanker et al. |
| 5,086,354 A | 2/1992 | Bass et al. |
| 5,113,272 A | 5/1992 | Reamey |
| 5,132,839 A | 7/1992 | Travis |
| 5,319,491 A | 6/1994 | Selbrede |
| 5,342,047 A | 8/1994 | Heidel et al. |
| 5,364,100 A | 11/1994 | Ludlow et al. |
| 5,375,830 A | 12/1994 | Takemoto et al. |
| 5,376,587 A | 12/1994 | Buchmann et al. |
| 5,393,061 A | 2/1995 | Manship et al. |

(Continued)

FOREIGN PATENT DOCUMENTS

EP    0 454 423    10/1991

(Continued)

OTHER PUBLICATIONS

"SPD," Malvino Inc., www.malvino.com, Jul. 19, 1999, 10 pages.

(Continued)

*Primary Examiner* — Amare Mengistu
*Assistant Examiner* — Dmitriy Bolotin
(74) *Attorney, Agent, or Firm* — Armstrong Teasdale, LLP

(57) ABSTRACT

A system to automatically blank a screen from a multi-layer display is disclosed. The system includes a multi-layer display, an associated logic device and a display controller in communication therewith and configured to receive signals from the logic device. The multi-layer display includes at least a first display screen and a second display screen positioned behind the first display screen, with both display screens in communication with the display controller. The display controller has a signal analyzer configured to analyze received signals, which are sent to one or both of the first and second display screens depending upon the results from the signal analyzer. Analysis results can involve whether signal resolution is greater than a predetermined amount. Signals sent to both display screens results in a multi-layer display presentation, while signals sent to only one screen results in the auto-blanking of the other screen for a single screen display presentation.

24 Claims, 6 Drawing Sheets

U.S. PATENT DOCUMENTS

| | | | |
|---|---|---|---|
| 5,467,893 A | 11/1995 | Landis, II et al. | |
| 5,539,547 A | 7/1996 | Ishii et al. | |
| 5,580,055 A | 12/1996 | Hagiwara | |
| 5,585,821 A | 12/1996 | Ishikura et al. | |
| 5,589,980 A | 12/1996 | Bass et al. | |
| 5,745,197 A | 4/1998 | Leung et al. | |
| 5,752,881 A | 5/1998 | Inoue | |
| 5,764,317 A | 6/1998 | Sadnovik et al. | |
| 5,910,046 A | 6/1999 | Wada et al. | |
| 5,951,397 A | 9/1999 | Dickinson | |
| 5,956,180 A | 9/1999 | Bass et al. | |
| 5,967,893 A | 10/1999 | Lawrence et al. | |
| 6,001,016 A | 12/1999 | Walker et al. | |
| 6,015,346 A | 1/2000 | Bennett | |
| 6,027,115 A | 2/2000 | Griswold et al. | |
| 6,050,895 A | 4/2000 | Luciano et al. | |
| 6,054,969 A | 4/2000 | Haisma | |
| 6,059,658 A | 5/2000 | Mangano et al. | |
| 6,135,884 A | 10/2000 | Hedrick et al. | |
| 6,159,098 A | 12/2000 | Slomiany et al. | |
| 6,213,875 B1 | 4/2001 | Suzuki | |
| 6,244,596 B1 | 6/2001 | Kondratjuk | |
| 6,251,014 B1 | 6/2001 | Stockdale et al. | |
| 6,252,707 B1 | 6/2001 | Kleinberger et al. | |
| 6,254,481 B1 | 7/2001 | Jaffe | |
| 6,315,666 B1 | 11/2001 | Mastera et al. | |
| 6,337,513 B1 | 1/2002 | Clevenger et al. | |
| 6,347,996 B1 | 2/2002 | Gilmore et al. | |
| 6,368,216 B1 | 4/2002 | Hedrick et al. | |
| 6,379,244 B1 | 4/2002 | Sagawa et al. | |
| 6,398,220 B1 | 6/2002 | Inoue | |
| 6,416,827 B1 | 7/2002 | Chakrapani et al. | |
| 6,444,496 B1 | 9/2002 | Edwards et al. | |
| 6,445,185 B1 | 9/2002 | Damadian et al. | |
| 6,491,583 B1 | 12/2002 | Gauselmann | |
| 6,503,147 B1 | 1/2003 | Stockdale et al. | |
| 6,511,375 B1 | 1/2003 | Kaminkow | |
| 6,512,559 B1 | 1/2003 | Hashimoto et al. | |
| 6,514,141 B1 | 2/2003 | Kaminkow et al. | |
| 6,517,433 B2 | 2/2003 | Loose et al. | |
| 6,517,437 B1 | 2/2003 | Wells et al. | |
| 6,547,664 B2 | 4/2003 | Saunders | |
| 6,575,541 B1 | 6/2003 | Hedrick et al. | |
| 6,585,591 B1 | 7/2003 | Baerlocher et al. | |
| D480,961 S | 10/2003 | Deadman | |
| 6,646,695 B1 | 11/2003 | Gauselmann | |
| 6,652,378 B2 | 11/2003 | Cannon et al. | |
| 6,659,864 B2 | 12/2003 | McGahn et al. | |
| 6,661,425 B1 | 12/2003 | Hiroaki | |
| 6,695,703 B1 | 2/2004 | McGahn | |
| 6,702,675 B2 | 3/2004 | Poole et al. | |
| 6,712,694 B1 | 3/2004 | Nordman | |
| 6,715,756 B2 | 4/2004 | Inoue | |
| 6,717,728 B2 | 4/2004 | Putilin | |
| 6,722,979 B2 | 4/2004 | Gilmore et al. | |
| 6,802,777 B2 | 10/2004 | Seelig et al. | |
| 6,817,945 B2 | 11/2004 | Seelig et al. | |
| 6,817,946 B2 | 11/2004 | Motegi et al. | |
| 6,887,157 B2 | 5/2005 | LeMay et al. | |
| 6,890,259 B2 | 5/2005 | Breckner et al. | |
| 6,906,762 B1 | 6/2005 | Witehira et al. | |
| 6,937,298 B2 | 8/2005 | Okada | |
| 7,095,180 B2 | 8/2006 | Emslie et al. | |
| 7,097,560 B2 | 8/2006 | Okada | |
| 7,128,647 B2 | 10/2006 | Muir | |
| 7,159,865 B2 | 1/2007 | Okada | |
| 7,160,187 B2 | 1/2007 | Loose et al. | |
| 7,204,753 B2 | 4/2007 | Ozaki et al. | |
| 7,207,883 B2 | 4/2007 | Nozaki et al. | |
| 7,220,181 B2 | 5/2007 | Okada | |
| 7,252,288 B2 | 8/2007 | Seelig et al. | |
| 7,255,643 B2 | 8/2007 | Ozaki et al. | |
| 7,309,284 B2 | 12/2007 | Griswold et al. | |
| 7,322,884 B2 | 1/2008 | Emori et al. | |
| 7,329,181 B2 | 2/2008 | Hoshino et al. | |
| 2001/0013681 A1 | 8/2001 | Bruzzese et al. | |
| 2002/0045472 A1 | 4/2002 | Adams | |
| 2002/0173354 A1 | 11/2002 | Winans et al. | |
| 2003/0027624 A1 | 2/2003 | Gilmore et al. | |
| 2003/0032478 A1 | 2/2003 | Takahama et al. | |
| 2003/0032479 A1 | 2/2003 | LeMay et al. | |
| 2003/0087690 A1 | 5/2003 | Loose et al. | |
| 2003/0130028 A1 | 7/2003 | Aida et al. | |
| 2003/0176214 A1 | 9/2003 | Burak et al. | |
| 2003/0236114 A1 | 12/2003 | Griswold et al. | |
| 2004/0023714 A1 | 2/2004 | Asdale | |
| 2004/0029636 A1 | 2/2004 | Wells | |
| 2004/0063490 A1 | 4/2004 | Okada | |
| 2004/0066475 A1 | 4/2004 | Searle | |
| 2004/0116178 A1 | 6/2004 | Okada | |
| 2004/0147303 A1 | 7/2004 | Imura et al. | |
| 2004/0150162 A1 | 8/2004 | Okada | |
| 2004/0162146 A1 | 8/2004 | Ooto | |
| 2004/0166925 A1 | 8/2004 | Emori et al. | |
| 2004/0171423 A1 | 9/2004 | Silva et al. | |
| 2004/0183972 A1 | 9/2004 | Bell | |
| 2004/0192430 A1 | 9/2004 | Burak et al. | |
| 2004/0198485 A1 | 10/2004 | Loose et al. | |
| 2004/0207154 A1 | 10/2004 | Okada | |
| 2004/0209666 A1 | 10/2004 | Tashiro | |
| 2004/0209667 A1 | 10/2004 | Emori et al. | |
| 2004/0209668 A1 | 10/2004 | Okada | |
| 2004/0209671 A1 | 10/2004 | Okada | |
| 2004/0209678 A1 | 10/2004 | Okada | |
| 2004/0209683 A1 | 10/2004 | Okada | |
| 2004/0214635 A1 | 10/2004 | Okada | |
| 2004/0214637 A1 | 10/2004 | Nonaka | |
| 2004/0219967 A1 * | 11/2004 | Giobbi et al. | 463/16 |
| 2004/0224747 A1 | 11/2004 | Okada | |
| 2004/0233663 A1 | 11/2004 | Emslie et al. | |
| 2004/0239582 A1 | 12/2004 | Seymour | |
| 2005/0032571 A1 | 2/2005 | Asonuma | |
| 2005/0037843 A1 | 2/2005 | Wells et al. | |
| 2005/0049032 A1 | 3/2005 | Kobayashi | |
| 2005/0049046 A1 | 3/2005 | Kobayashi | |
| 2005/0052341 A1 * | 3/2005 | Henriksson | 345/4 |
| 2005/0062410 A1 | 3/2005 | Bell et al. | |
| 2005/0063055 A1 | 3/2005 | Engel | |
| 2005/0079913 A1 | 4/2005 | Inamura | |
| 2005/0085292 A1 | 4/2005 | Inamura | |
| 2005/0153772 A1 | 7/2005 | Griswold et al. | |
| 2005/0153775 A1 | 7/2005 | Griswold et al. | |
| 2005/0192090 A1 | 9/2005 | Muir et al. | |
| 2005/0206582 A1 | 9/2005 | Bell et al. | |
| 2005/0208994 A1 | 9/2005 | Berman | |
| 2005/0233799 A1 | 10/2005 | LeMay et al. | |
| 2005/0239539 A1 | 10/2005 | Inamura | |
| 2005/0255908 A1 * | 11/2005 | Wells | 463/20 |
| 2005/0266912 A1 | 12/2005 | Sekiguchi | |
| 2005/0285337 A1 | 12/2005 | Durham et al. | |
| 2006/0100014 A1 | 5/2006 | Griswold et al. | |
| 2006/0103951 A1 | 5/2006 | Bell et al. | |
| 2006/0125745 A1 | 6/2006 | Evanicky | |
| 2006/0166727 A1 | 7/2006 | Burak | |
| 2006/0191177 A1 | 8/2006 | Engel | |
| 2006/0284574 A1 | 12/2006 | Emslie et al. | |
| 2006/0290594 A1 | 12/2006 | Engel et al. | |
| 2007/0004510 A1 | 1/2007 | Underdahl et al. | |
| 2007/0004513 A1 | 1/2007 | Wells et al. | |
| 2007/0010315 A1 | 1/2007 | Hein | |
| 2007/0091011 A1 * | 4/2007 | Selbrede | 345/4 |
| 2008/0007486 A1 * | 1/2008 | Fujinawa et al. | 345/5 |
| 2008/0020816 A1 | 1/2008 | Griswold et al. | |
| 2008/0020839 A1 | 1/2008 | Wells et al. | |
| 2008/0020840 A1 | 1/2008 | Wells et al. | |
| 2008/0020841 A1 | 1/2008 | Wells et al. | |
| 2009/0091513 A1 * | 4/2009 | Kuhn | 345/4 |

FOREIGN PATENT DOCUMENTS

| | | |
|---|---|---|
| EP | 0 484 103 | 5/1992 |
| EP | 0 997 857 | 10/1999 |
| EP | 1 260 928 | 11/2002 |
| EP | 1 282 088 | 2/2003 |
| EP | 1 462 152 A2 | 9/2004 |
| EP | 1826739 A1 * | 8/2007 |
| GB | 1 464 896 | 2/1977 |
| JP | 04-220276 | 8/1992 |

| | | |
|---|---|---|
| JP | 06-043425 | 2/1994 |
| JP | 07-124290 | 5/1995 |
| JP | 2000-300729 | 10/2000 |
| JP | 2000-350805 | 12/2000 |
| JP | 2001-062032 | 3/2001 |
| JP | 2001-238995 | 9/2001 |
| JP | 2001-252393 | 9/2001 |
| JP | 2001-252394 | 9/2001 |
| JP | 2002-085624 | 3/2002 |
| JP | 2004-089707 | 3/2004 |
| JP | 2004-105616 | 4/2004 |
| JP | 2004-166879 | 6/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-346226 | 12/2006 |
| WO | 99/42889 | 8/1999 |
| WO | 99/44095 | 9/1999 |
| WO | 01/15127 | 3/2001 |
| WO | 01/15128 | 3/2001 |
| WO | 01/15132 | 3/2001 |
| WO | 01/09664 | 8/2001 |
| WO | 03/039699 | 5/2003 |
| WO | 04/001486 | 12/2003 |
| WO | 2004/102520 | 11/2004 |
| WO | 2006/034192 | 3/2006 |
| WO | 2006/038819 | 4/2006 |

OTHER PUBLICATIONS

Bosner, "How Smart Windows Work," HowStuffWorks, Inc.,www.howstuffworks.com, 1998-2004, 9 pages.
Exam Report dated Sep. 21, 2007 from European Application No. 05 705 315.9.
Novel 3-D Video Display Technology Developed, News release: Aug. 30, 1996, www.eurekalert.org/summaries/1199.html, printed from Internet Archive using date Sep. 2, 2000.
Saxe et al., "Suspended-Particle Devices," www.refr-spd.com, Apr./May 1996, 5 pages.
Time Multiplexed Optical Shutter (TMOS): A revolutionary Flat Screen Display Technology, www.vea.com/TMOS.html, Apr. 8, 1999, printed from Internet Archive using date Oct. 6, 1999.
Time Multiplexed Optical Shutter (TMOS): A revolutionary Flat Screen Display Technology, www.tralas.com/TMOS.html, Apr. 5, 2001, printed from Internet Archive using date Apr. 11, 2011.
U.S. Appl. No. 11/938,086, filed on Nov. 9, 2007.
U.S. Appl. No. 11/877,611, filed on Oct. 23, 2007.
Office Action dated Aug. 29, 2007 from U.S. Appl. No. 10/755,598.
Office Action dated Oct. 31, 2007 from U.S. Appl. No. 10/213,626.
Final Office Action dated Mar. 28, 2007 from U.S. Appl. No. 10/213,626.
Office Action dated Apr. 27, 2006 from U.S. Appl. No. 10/213,626.
Final Office Action dated Jan. 10, 2006 from U.S. Appl. No. 10/213,626.
Office Action dated Aug. 31, 2004 from U.S. Appl. No. 10/213,626.
"Light Valve". [online] [retrieved on Nov. 15, 2005]. Retrieved from the Internet URL http://www.meko.co.uk/lightvalve.shtml (1 page).
"Liquid Crystal Display". [online]. [retrieved on Nov. 16, 2005]. Retrieved form the Internet URL http://en.wikipedia.org/wiki/LCD (6 pages).
Bonsor, Kevin, "How Smart Windows Will Work," Howstuffworks, Inc. 1998-2002, http://www/howstuffworks.com/smart-window.htm/printable. Printed. Nov. 25, 2002 (5 pages).
"What is SPD?" SPD Systems, Inc. 2002, http://www.spd-systems.com/spdq.htm. Printed Dec. 4, 2002 (2 pages).
"Debut of the Let's Make a Deal Slot Machine," Let's Make a Deal 1999-2002, http:///www.letsmakeadeal.com/pr01.htm. Printed Dec. 3, 2002 (2 pages).
U.S. Appl. No. 11/849,119, filed Aug. 31, 2007.
U.S. Appl. No. 11/858,695, filed Sep. 20, 2007.
U.S. Appl. No. 11/858,845, filed Sep. 20, 2007.
U.S. Appl. No. 11/859,127, filed Sep. 21, 2007.
U.S. Appl. No. 11/938,184, filed Nov. 9, 2007.
U.S. Appl. No. 11/938,151, filed Nov. 9, 2007.

* cited by examiner

AUTO-BLANKING SCREEN FOR DEVICES HAVING MULTI-LAYER DISPLAYS

TECHNICAL FIELD

The present invention relates generally to processor-based devices having multi-layer displays and more specifically to the blanking of a screen within such a multi-layer display.

BACKGROUND

Display technologies have progressed at a rapid rate in recent years, with the advent of plasma displays, flat panel displays, three-dimensional ("3-D") simulating displays and the like. Such advanced displays can be used for televisions, monitors, and various other electronics and processor-based devices. Processor-based gaming machines adapted to administer a wager-based game are but one particular example of the kind of specialized electronic devices that can benefit from the use of such new and improved display technologies.

Recent advances in such display technologies include the development of displays having multiple layers of screens that are "stacked" or otherwise placed in front or back of each other to provide an overall improved visual presentation on a single combined display unit. Examples of such multi-layer displays include those that are commercially available from PureDepth, Inc. of Redwood City, Calif. The PureDepth technology incorporates two or more liquid crystal display ("LCD") screens into one physically combined display unit, where each LCD screen is separately addressable to provide separate or coordinated images between the LCD screens. Many of the PureDepth display systems include a high-brightened backlight, a rear image panel, such an active matrix color LCD, a diffuser, a refractor, and a front image plane, which devices are laminated to form a device "stack."

The multiple LCD screens in these units are stacked at set distances. As well as using a binocular depth cue, PureDepth units also feature intrinsic motion parallax, where the x and y distance changes between objects displayed on different planes depending on viewing angle. In addition, separate focal planes may literally be brought in and out of focus depending on the focal length of the lens in the eye of a viewer. Further details regarding the basic nature of such multi-layer displays and techniques of solving issues that are specific to such displays can be found at, for example, U.S. Patent Publication Nos. 20060103951 and 20050206582, both of which are incorporated by reference for these general purposes.

The basic nature of a multi-layer display using stacked screens strongly encourages at least some form of coordination between the various images on the multiple screens. While various images on each separate screen might be clear and comprehensible if each screen were used separately in a traditional single screen display format, independent and uncoordinated images and/or text on these screens when stacked together can result in an unintelligible mess to a viewer. Such independent and uncoordinated images and/or text tend to obscure or completely block each other in numerous locations, making the combined visual presentation dark and largely unreadable.

Such issues involving independent and uncoordinated images and/or text can arise, for example, when the multiple display screens are all controlled by various PC based video cards. While the use of relatively complex display modes that account for the specialized nature of a stacked multi-layer display will typically be acceptable, displayed images and/or text in DOS, BIOS, VESA modes and potentially other more basic video modes can be duplicated across multiple screens in the stack at the same time, with such multiple, stacked and uncoordinated images and/or text being difficult to read as a result. Other video modes that are not particular adapted for or readily usable with such a multi-layer display screen arrangement may also be unfriendly with respect to such multi-layer displays. Some examples of the problems that can arise when the stacked screens of a multi-layer display occur in a basic video mode outputting uncoordinated images and/or text during a diagnostics process, or during the start or boot up process in the associated processor-based device. In such instances, it can be difficult or impossible to view or comprehend all of the images and/or texts being shown by the various screens in the multi-layer stack.

While existing designs and systems for multi-layer displays have been adequate in the past, improvements are certainly welcomed and encouraged. In light of the foregoing, it is thus desirable to develop improved multi-layer displays that do not suffer from image and/or text duplication or blocking when one or more of the subject display screens is in a basic or otherwise unfriendly video mode.

SUMMARY

It is an advantage of the present invention to provide improved multi-layer displays that do not suffer from image and/or text duplication or blocking when one or more of the subject display screens is in a basic or otherwise unfriendly video mode. This can be accomplished at least in part through the automatic blanking of one or more of the display screens in the multi-layer display whenever the multiple screens would otherwise present visual displays that are in conflict or would not otherwise be coordinated. In many embodiments, this can involve the use of a display controller including a display signal analyzer configured to analyze incoming display signals for one or more screen blanking criteria.

In various embodiments of the present invention, a multi-layer display apparatus is provided. This multi-layer display apparatus can include a logic device adapted to transmit display signals, a display controller configured to receive one or more of the transmitted display signals, and first and second display screens in communication with the display controller and adapted to present first and second graphical displays thereupon based upon the transmitted display signal or signals. The second display screen can be positioned behind the first display screen such that the first and second graphical displays thereon are adapted to combine for a single visual presentation to a viewer thereof. The display controller can include a display signal analyzer configured to analyze the display signal or signals for one or more screen blanking criteria, and the display controller can be adapted to facilitate the presentation of a substantially blank display on one of the first and second display screens whenever one of the screen blanking criteria is present with respect to the transmitted display signal or signals.

In various embodiments, an apparatus to automatically blank one display screen within a multi-layer display device is provided. Such an apparatus can include a means for receiving at least one display signal, a means for analyzing the at least one display signal for one or more screen blanking criteria, a means for transmitting at least a portion of the at least one display signal to a first display screen within the multi-layer display device, and a means for automatically displaying a substantially blank display on a second display screen of the multi-layer display device whenever one of the screen blanking criteria has been analyzed to be present with respect to the at least one display signal. As in the case of other embodiments involving a multi-layer display, the first and second display screens can be positioned front-to-back such that said the respective graphical displays thereon are adapted to combine for a single visual presentation to a viewer thereof.

In various embodiments, specific devices including one of the above multi-layer display devices or apparatuses are provided. Such specific devices can include, for example, a wager-based gaming machine. Such a gaming machine can be adapted to accept a wager, administer a game based on the wager, and award a monetary prize based upon the outcome of the game. Gaming machine components can include a cabinet defining an interior region and adapted to house a plurality of gaming machine components, a first display device disposed within or about the interior region and configured to output a visual image in response to a control signal, a second display device arranged relative to the first display device such that a common line of sight passes through a portion of the first display device to a portion of the second display device, at least one logic device configured to execute instructions to transmit display signals adapted for display on each of the first and second display devices, and at least one display controller in communication with the logic device, first display device and said second display device. The display controller can be configured to transmit the display signals from the logic device to the first display device and the second display device, can have a signal analyzer configured to analyze the display signals for one or more screen blanking criteria, and can be adapted to facilitate the presentation of a substantially blank display on one of the first and second display devices whenever one of the screen blanking criteria is present with respect to the display signals.

In various related embodiments, a gaming system is provided. Such a gaming system includes a plurality of wager-based gaming machine, which may be identical or similar to those gaming machines noted above. In addition, the gaming system can include a remote host that is in communication with each of the gaming machines and is adapted to provide one or more of display signals to each of the plurality of gaming machines, which gaming machines can be processor-based. One or more display signal analyzers configured to analyze display signals for one or more screen blanking criteria can also be present within the system, with such display signal analyzer or analyzers being adapted to communicate the presence of one or more screen blanking criteria to the gaming machines, and wherein the display controller of each such gaming machine is adapted to facilitate the presentation of a substantially blank display on one of its multi-layered display devices whenever one of such screen blanking criteria is present with respect to the display signals being transmitted to its respective gaming machine. Such display signal analyzer or analyzers can be located remotely on the gaming system, and/or within one or more of the gaming machines themselves.

Further features and items may also be found in any of the foregoing embodiments, and it will be readily appreciated that various combinations of the following features and items may be used. For example, the various screen blanking criteria can include one or more of a specific display mode, a specific display resolution and a specific refresh rate detected within said at least one display signal. Such specific display resolutions can be selected from the group consisting of 640× 480 pixels, 720×400 pixels, 800×600 pixels and 1280×1024 pixels, such specific display modes can be selected from the group consisting of DOS, BIOS and VESA modes, and such a specific refresh rate can be any rate that is other than about 60 Hz. In various embodiments, the substantially blank display can be generated for one of the first and second display screens whenever at least two of the screen blanking criteria are present with respect to the pertinent display signal or signals. Further variations may require even more screen blanking criteria to be present before a substantially blank display is generated.

In various embodiments, the multi-layer display screens can comprise liquid crystal display screens. In addition, the multi-layer displays can include a third display screen in communication with the display controller and adapted to present a third graphical display thereupon based upon the display signal or signals, with the third display screen being positioned between the first and second display screens such that the first, second and third graphical displays are adapted to combine for a single visual presentation to a viewer thereof. In such instances, the display controller can be adapted to facilitate the presentation of a substantially blank display on the third display screen whenever one of the screen blanking criteria is present with respect to the display signal or signals. Additional display screens beyond a third display screen may also be implemented into the multi-layer displays.

In various embodiments, the noted display signal(s) comprises multiple display signals, wherein each of the multiple display signals is designed for use on a separate display screen. In other embodiments, the noted display signal(s) comprises a single display signal, wherein this single display signal is adapted to be split into subcomponents that are each designed for use on a separate display screen.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive multi-layer displays and methods of presenting displays thereupon.

DETAILED DESCRIPTION

Exemplary applications of apparatuses and methods according to the present invention are described as follows. These examples are being provided solely to add context and aid in the understanding of the invention. It will be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as definitive or limiting in scope or setting. Although these examples are described in sufficient detail to enable one skilled in the art to practice the invention, it will be understood that they are not limiting, such that other embodiments may be used and changes may be made without departing from the spirit and scope of the invention.

Embodiments are described herein in the context of auto blanking one or more display screens for multi-layer display devices. The respective multi-layer display devices can be a part of any number and variety of devices that utilize a display. Although various specific examples are described herein with reference to a wager-based gaming machine, it will be understood that the present invention may be used with such a gaming machine and/or any other suitable device that utilizes a multi-layer display, such as used in personal computers, video games, televisions, monitors, billboard displays, and the like. Other embodiments will readily suggest themselves to such skilled persons having the benefit of this disclosure.

Multi-Layer Displays

Figure 1A:
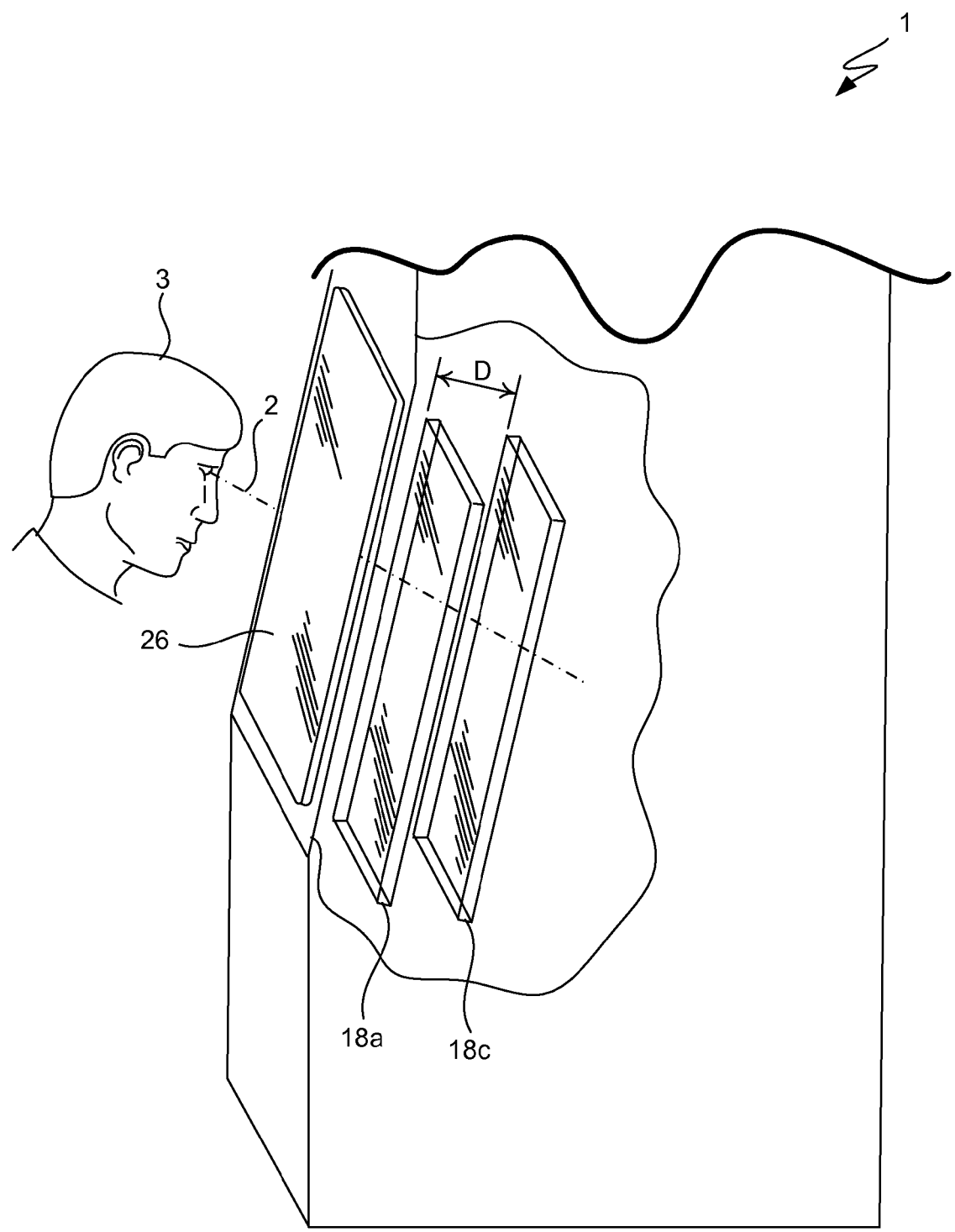
FIG. 1A illustrates in partial perspective and cut-away view an exemplary device having a multi-layer display with two display screens.
Figure 1B:
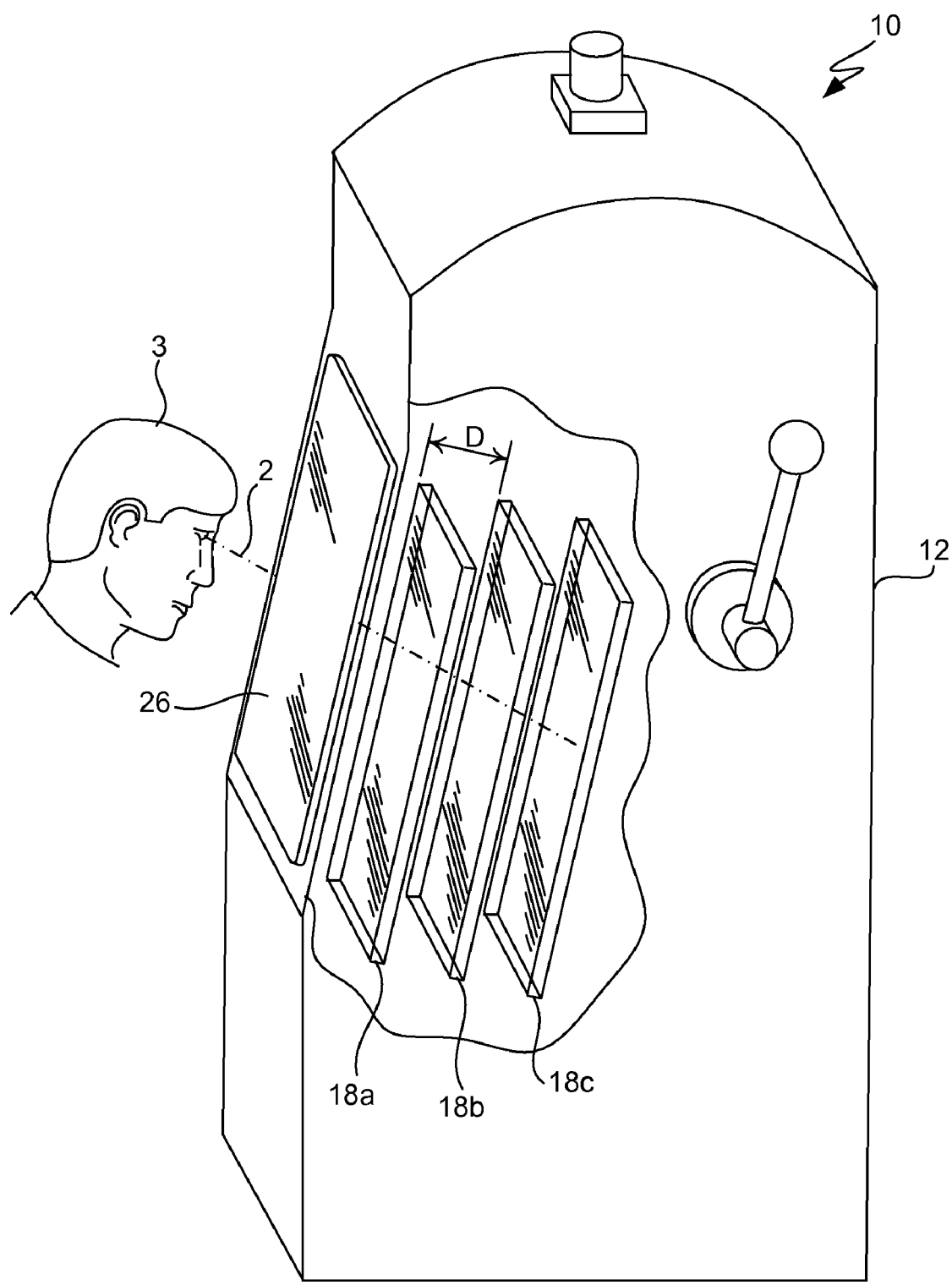
FIG. 1B illustrates in partial perspective and cut-away view an exemplary wager-based gaming machine having a multi-layer display with three display screens.

A general overview of multi-layer displays will first be provided. FIGS. 1A and 1B illustrate exemplary devices having multi-layer displays. FIG. 1A shows a generic device 1 having a multi-layer display with two display screens 18a, 18c positioned front-to-back, while FIG. 1B shows a wager-based gaming machine 10 having a multi-layer display with three display screens 18a, 18b, 18c positioned front-to-back. A predetermined spatial distance "D" separates display screens for the multi-layered displays. This predetermined distance, D, represents the distance from the display surface of display screen 18a to the display surface of an adjacent display screen (18b in FIG. 1B or 18c in FIG. 1A). This distance D may be adapted as desired by a multi-layer display manufacturer. In one embodiment, the display screens are positioned adjacent to each other such that only a thickness of the display screens separates the display surfaces. In this case, the distance D depends on the thickness of the exterior display screen. In a specific embodiment, distance "D" is selected to minimize spatial perception of interference patterns between the screens. Distance D can be adapted to improve perception of a three-dimensional display. Spatially separating the screens 18a and 18c allows a person to perceive actual depth between video output on display screen 18a and video output on rear display screen 18c.

Layered display devices (i.e., multi-layer displays) may be described according to their position along a common line of sight 2 relative to a viewer 3. As the terms are used herein, 'proximate' refers to a display screen that is closer to a person, along a common line of sight (such as 2 in FIG. 1A), than another display screen. Conversely, 'distal' refers to a display screen that is farther from a person, along the common line of sight 2, than another. While the layered displays of FIGS. 1A and 1B are shown set back from a touchscreen 26, it will be understood that this is for illustrative purposes, such that the exterior display screen 18a may be closer to touchscreen 26. Further, in some embodiments a touchscreen may not be included, such that outer viewing surface 26 can merely be glass, plastic or another see-through material comprising a covering component. In other embodiments, no covering component 26 is provided, and the proximate display screen from the multi-layer display may be directly exposed to a viewer.

Under the control of an associated display processor, which may store video data and/or also facilitate the transmission of display signals, display devices or screens 18a, 18b, 18c generate visual images and information for display to a person or player 3. The proximate display devices 18a and 18b each have the capacity to be partially or completely transparent or translucent. In a specific embodiment, the relatively flat and thin display devices 18a and 18b are LCDs. Other display technologies are also suitable for use. Various companies have developed relatively flat display devices that have the capacity to be transparent or translucent. One such company is Uni-Pixel Displays, Inc. of Houston Tex., which sells display screens that employ time multiplex optical shutter ("TMOS") technology. This TMOS display technology includes: (a) selectively controlled pixels that shutter light out of a light guidance substrate by violating the light guidance conditions of the substrate and (b) a system for repeatedly causing such violation in a time multiplex fashion. The display screens that embody TMOS technology are inherently transparent and they can be switched to display colors in any pixel area.

A transparent OLED may also be used. An electroluminescent display may also be suitable for use with proximate display devices 18a and 18b. Also, Planar Systems Inc. of Beaverton, Oreg. and Samsung, of Korea, both produce several display devices that are suitable for the uses described herein and that can be translucent or transparent. Kent Displays Inc. of Kent, Ohio also produces Cholesteric LCD display devices that operate as a light valve and/or a monochrome LCD panel. Other multi-layer display devices are discussed in detail in co-pending U.S. patent application Ser. No. 11/514,808, entitled "Gaming Machine With Layered Displays," filed Sep. 1, 2006, which is incorporated herein by reference in its entirety and for all purposes.

Regardless of the exact technology used, LCD or otherwise, it will be readily appreciated that each display screen or device 18a, 18b, 18c is generally adapted to present a graphical display thereupon based upon one or more display signals. While each display screen 18a, 18b, 18c is generally able to make its own separate visual presentation to a viewer, two or more of these display screens are positioned (i.e., "stacked") in the multi-layer display such that the various graphical displays on each screen are combined for a single visual presentation to a viewer.

The layered display screens 18 may be used in a variety of manners to present visual images to a user or player. In some cases, video data and images displayed on the display devices 18a and 18c are positioned such that the images do not overlap (that is, the images are not superimposed). In other instances, the images do overlap. It should also be appreciated that the images displayed on the display screen can fade-in fade out, pulsate, move between screens, and perform other inter-screen graphics to create additional affects, if desired.

In another specific embodiment, layered display screens or devices 18 provide 3-D effects. Generic device 1 or gaming machine 10 may use a combination of virtual 3-D graphics on any one of the display screens—in addition to 3-D graphics obtained using the different depths of the layered display devices. Virtual 3-D graphics on a single screen typically involve shading, highlighting and perspective techniques that selectively position graphics in an image to create the perception of depth. These virtual 3-D image techniques cause the human eye to perceive depth in an image even though there is no real depth (the images are physically displayed on a single display screen, which is relatively thin). Also, the predetermined distance, D (between display screens for the layered display devices) facilitates the creation of 3-D effects having a real depth between the layered display devices. 3-D presentation of graphic components may then use a combination of: a) virtual 3-D graphics techniques on one or more of the multiple screens; b) the depths between the layered display devices; and c) combinations thereof. The multiple display devices may each display their own graphics and images, or cooperate to provide coordinated visual output. Objects and graphics in an overall visual presentation may then appear on any one or multiple of the display devices, where graphics or objects on the proximate screen(s) can block the view of graphics or objects on the distal screen(s), depending on the position of the viewer relative to the screens. This provides actual perspective between the graphical objects, which represents a real-life component of 3-D visualization (and not just perspective virtually created on a single screen).

Other effects and details may be used with respect to such multi-layer displays and their respective devices and systems, and it will be readily appreciated that such other effects and details may also be present with respect to the invention disclosed herein to be used with multi-layer displays, as may be suitable. In addition, although embodiments of multi-layer displays having two and three display screens have been presented and discussed, it will be readily appreciated that further display screens may be added to the multi-layer display in a similar manner. Such multi-layer displays could potentially have four, five or even more display screens arranged front-to-back in a relatively stacked arrangement, as in the case of the illustrated embodiments having two and three display screens.

Gaming Machines and Systems

Figure 2:
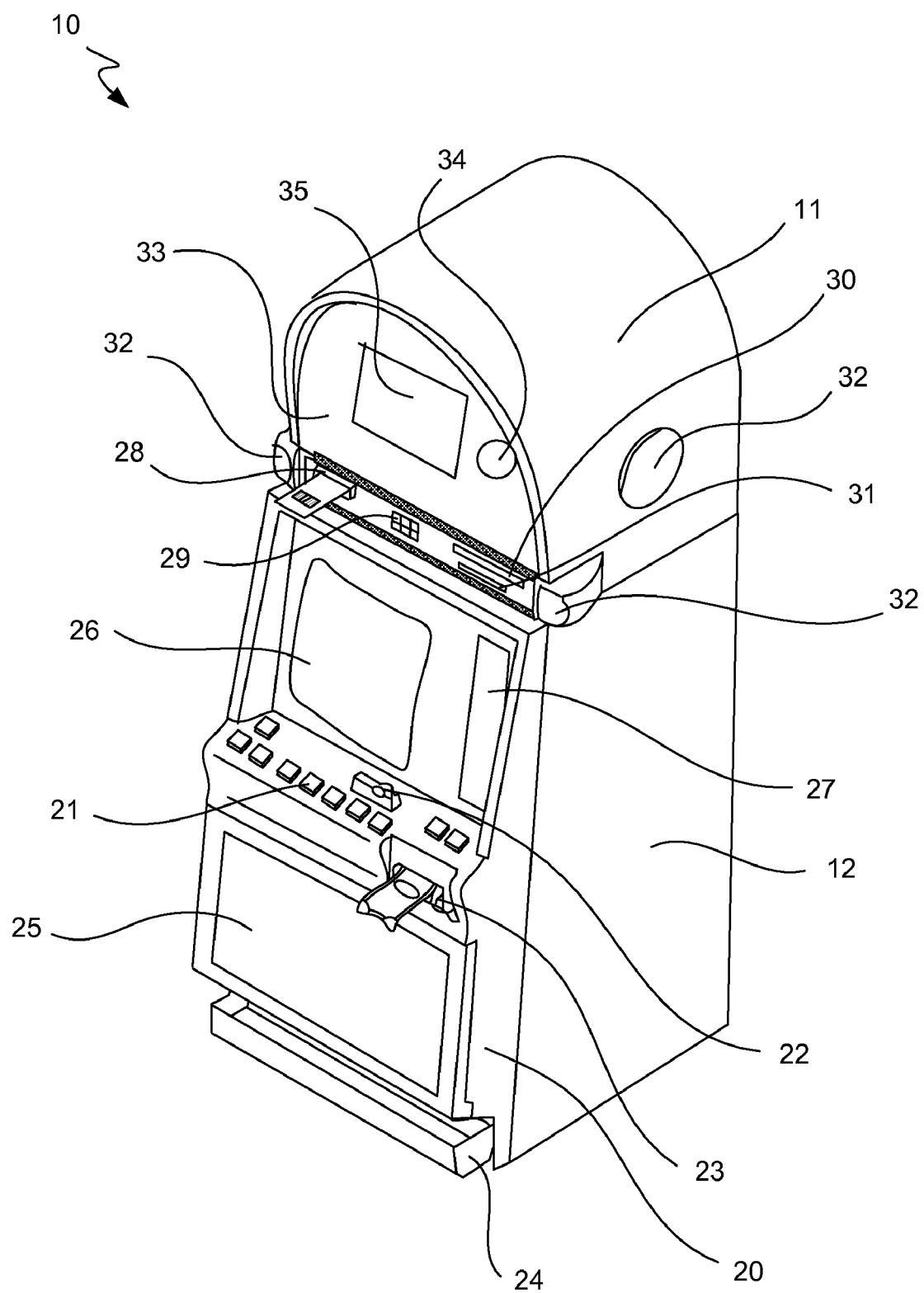
FIG. 2 illustrates in perspective view an exemplary gaming machine.

Referring next to FIG. 2, an exemplary processor-based gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, which collectively form a button panel, one or more money or credit acceptors, such as a coin acceptor 22 and a bill or ticket validator 23, a coin tray 24, and a belly glass 25. Viewable through main door 20 is a primary video display monitor 26 adapted to present a game and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket dispenser 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 10 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. Other features and functions may also be used in association with gaming machine 10, and it is specifically contemplated that the present invention can be used in conjunction with such a gaming machine or device that might encompass any or all such additional types of features and functions. In various preferred embodiments, gaming machine 10 can be adapted to present a video simulation of a reel based game involving a plurality of gaming reels.

Although a generic gaming machine 10 has been illustrated in FIG. 2, it will be readily appreciated that such a wager-based gaming machine can include a multi-layer display, such as that shown in FIG. 1A. Also, as noted above, a wide variety of devices can be used with the disclosed specialized multi-layer displays and systems, and such devices are not limited to gaming machines. While such gaming machines will be further described with respect to a gaming network or system, it will be readily appreciated that alternative devices having multi-layer displays may also be included in a similar network or system.

General Gaming Network And System Configurations

Figure 3:
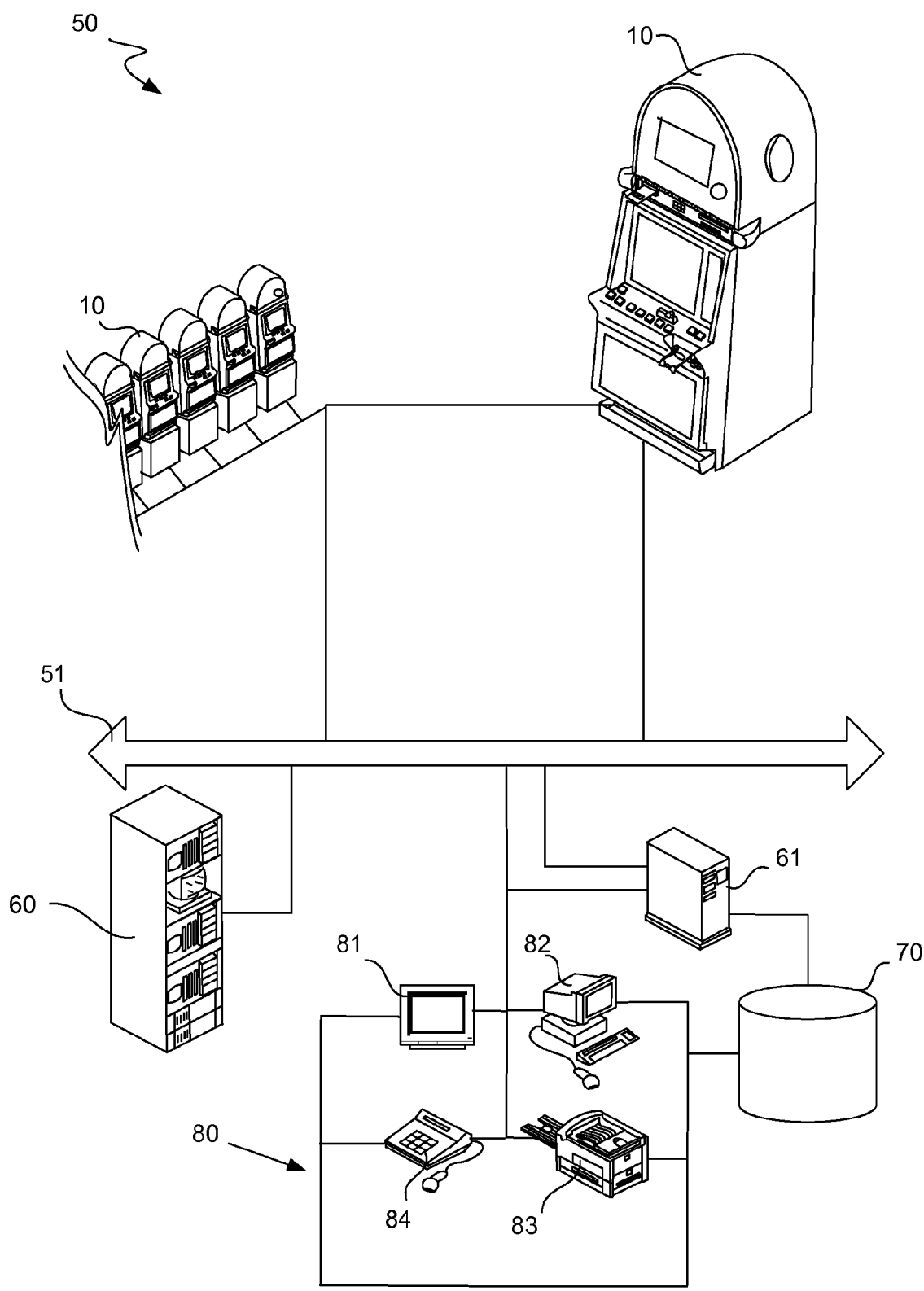
FIG. 3 illustrates in block diagram format an exemplary network infrastructure for providing a gaming system having one or more gaming machines.

Continuing with FIG. 3, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 61, a sub-network of peripheral devices 80, and/or a database 70.

A general-purpose server 60 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a ticket validator or other security identifier, among others. Similarly, under either embodiment of an isolated or shared network, at least the specialized server 61 or another similar component within a general-purpose server 60 also preferably includes a connection to a database or other suitable storage medium 70. Database 70 is preferably adapted to store many or all files containing pertinent data or information for a particular purpose, such as, for example, data regarding visual image data, video clips, other displayable items, and/or related data, among other potential items. Files, data and other information on database 70 can be stored for backup purposes, and are preferably accessible at one or more system locations, such as at a general-purpose server 60, a special purpose server 61 and/or a cashier station or other sub-network location 80, as desired.

In some embodiments, one or both of general-purpose server 60 and special purpose server 61 can be adapted to download various games and/or to transmit video or display signals to one or more gaming machines 10. Such downloaded games can include reel-based slots type games. Such downloads of games or transmission of video or display signals can occur based on a request or command from a player or a casino operator, or can take place in an automated fashion by system 50, such as via a particular prompt or trigger. In the event that display signals are transmitted, such display signals may include one or more signals intended for use on a multi-layer display.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or controller arrangements are added, such as controllers, storage media, and/or other components that may be associated with a dynamic display system adapted for use across multiple gaming machines and devices. In addition to new hardware, new functionality via new software, modules, updates or otherwise can be provided to an existing database 70, specialized server 61 and/or general-purpose server 60, as desired. Other modifications to an existing system may also be necessary, as might be readily appreciated.

Automatic Blanking of Display Screens

As noted above, one problem that can be encountered with a typical multi-layer display is the difficulty in viewing anything on the combined overall visual presentation whenever the first, second and/or additional graphical or visual displays on each of the individual screens are not coordinated, or do not otherwise readily permit the view of displays on each screen. That is, whenever even one of the display screens within a stack of multi-layered display screens presents its own images without regard to what might be on any of the other display screens, it can be difficult or impossible to view anything at all, particularly where one of the colliding or conflicting images or regions is dark. Such conflicts can arise during a boot, start-up or diagnostics process on the overall device housing or using the multi-layer display, particularly where displays are automated in firmware during such a boot process.

In particular various BIOS boot screens and VESA video modes are typically used during processes where an outside controller to a display device cannot control what is being displayed on the display device. As is generally known in the art, the firmware or code specific to the display device itself typically controls what is being shown on the display device during boot processes and other situations where BIOS, VESA and other basic video modes are used. The inability of an outside controller to control or coordinate the content on multiple screens, at least during such start-up, boot, and other critical times, serves to exacerbate viewing conflicts between the displays on multiple screens within a multi-layer display. Such viewing conflicts can be alleviated through the use of the various specialized controller arrangements and configurations disclosed herein.

In various preferred embodiments, the firmware of the multi-layer display device itself can be adapted to analyze the relevant display signals to determine whether or not one or more of the various display screens should be automatically blanked out at a particular time. Such components can then facilitate such an automated blanking of one or more display screens of the overall multi-layer display based upon whether one or more screen blanking criteria are detected in the received display signal or signals. In this manner, the relevant screen or screens that should be viewed as a single display can be more easily seen.

Figure 4A:
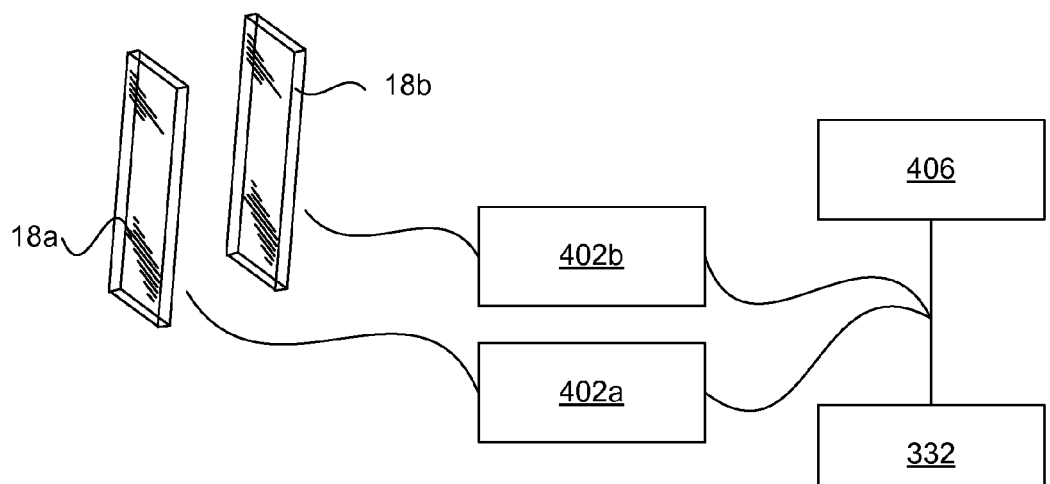
FIGS. 4A through 4C illustrates in block diagram format exemplary controller systems for multi-layer displays according to various embodiments of the present invention.
Figure 4B:
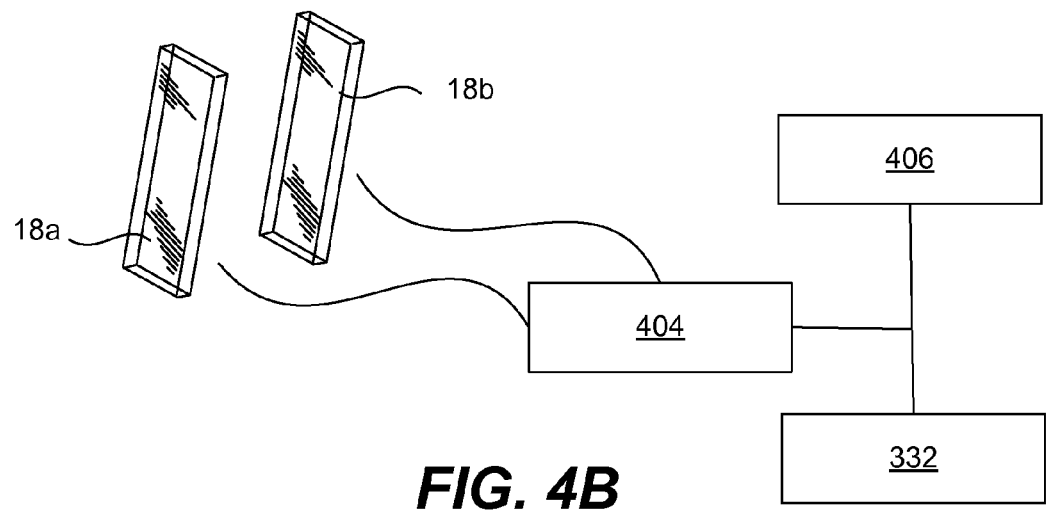
Figure 4C:
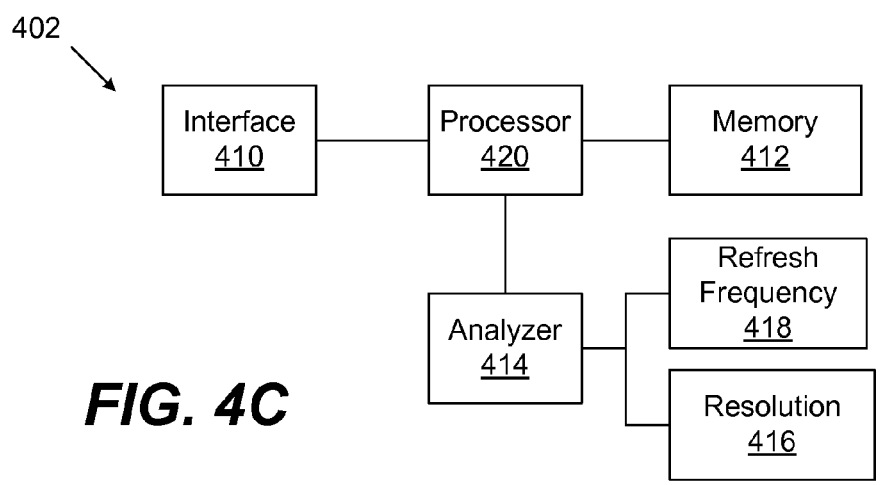

FIGS. 4A through 4C illustrate in block diagram format exemplary controller systems for multi-layer displays according to various embodiments of the present invention. FIG. 4A illustrates one embodiment whereby a separate display controller 402a, 402b may be coupled to each of the separate display screens 18a, 18b in a multi-layer display. Although only two display screens (and display controllers) are shown for purposes of illustration, it will be readily appreciated that one or more additional display screens may also be used. The embodiment of FIG. 4B is similar to that of FIG. 4A, except that a single display controller 404 may be coupled to each of the display devices 18*a*, 18*b*, such that one display controller 404 controls all the display devices 18*a*, 18*b*.

Where each display screen has its own display controller, such as that which is shown in FIG. 4A, each display controller could then receive its own separate display signal for display on its respective display screen. A similar arrangement might exist where a display controller is adapted to control multiple display screens, such as that which is shown in FIG. 4B, in that display controller 404 could receive multiple display signals and then be configured to send the appropriate display signal for display to each respective display screen.

Alternatively, display controller 404 could receive a "doubled" display signal, such as a "double-wide" or "double-tall" signal comprising one signal having two distinct displayable portions therein. In such cases, the display controller can be adapted to split such a doubled signal and send one portion to one display screen and another portion to another display screen. For example, two different 800×600 pixel display portions for two separate display screens might be bundled into a single "double-tall" 800×1200 pixel signal for ease of transmission. Display controller 404 could be adapted to split this single signal into its appropriate components to send each component to its proper display screen. In such instances, the respective display resolutions for screen blanking criteria could be adjusted accordingly, as will be readily appreciated.

The display controller(s) 402*a*, 402*b*, 404 may be in communication with a logic device, such as processor 332. The display controller(s) 402*a*, 402*b*, 404 may receive data and/or display signals from the processor 332, such as start-up display data to display on the display devices 18*a*, 18*b*. The display controller(s) 402*a*, 402*b*, 404 may also be in communication with a video processor 406. However, display controller(s) 402*a*, 402*b*, 404 generally communicate with the video processor 406 after initial boot or start-up is completed.

FIG. 4C illustrates an exemplary display controller 402 (i.e., display controller(s) 402*a*, 402*b* or 404) of FIGS. 4A and 4B. The display controller 402 may have an interface 410 to allow the display controller 402 to communicate with other devices, such as processor 322, video processor 406, and the like. The type of interface is not intended to be limiting, as any combination of hardware and software needed to allow the various input/output devices to communicate with the other devices may be used. The interface 410 may be in communication with processor 420. The processor 420 may be in communication with memory 412. Memory 412 may be separate from processor 420 as illustrated or may be part of processor 410. Memory 412 may be any known type of memory, such as a random access memory, to store data. Furthermore, although illustrated with a single memory, any number of memories may be used as desired.

Processor 420 may run or be associated with a data or display signal analyzer 414. Data or display signal analyzer 414 can be configured to analyze one or more received display signals for one or more screen blanking criteria. Screen blanking criteria can include a specific display mode, a specific display resolution and/or a specific refresh rate detected with respect to a given display signal. For example, the resolution 416 and/or refresh rate 418 of a given display signal can be analyzed by analyzer 414.

As will be readily appreciated, there can be significant differences between the video or display signals that are intended for use to create a coordinated visual presentation on multiple display screens, and those video or display signals that are not intended for such use. Again, pertinent examples of display signals that are not for use on multiple stacked displays can include those signals that are sent during a boot, start-up or diagnostics process. Typically, the types of signals that are sent during these times can be distinguished from the relatively more complex signals that are sent for a robust multi-layer display presentation. For example, typical boot or diagnostics signals are sent using DOS, BIOS or VESA video modes. Screen resolutions for these modes tend to be larger or cruder, and the refresh rate of such signals tends to be slower than the more complex displays and modes that would be used for a typical multi-layer display visual presentation.

Accordingly, the display signal analyzer can be adapted to detect the presence of a display signal that is in DOS, BIOS or VESA modes. Of course, other display modes and/or other screen-blanking criteria may also be used. If such a display signal mode (or other critical screen-blanking criteria) is detected, then the associated display controller can facilitate the presentation of a substantially blank display on the appropriate screen or screens. In some embodiments, this can be accomplished by sending an instruction from the display controller to the screens to be blanked. In some embodiments, the display controller can simply forward a display signal that is completely or substantially blank. In various embodiments, the screen or screens to be blanked can be those that correspond to display signals that are detected to have the screen blanking criteria, while in some embodiments, the detection of certain screen blanking criteria can result in other screens being blanked instead, and/or the use of the affected display signal on an actual display.

With respect to the "blanking" of a display screen it will be appreciated that such blanking is accomplished by rendering the affected display screen as effectively transparent, such that the visual display on one or more other screens in the multi-layer display may be perceived by a viewer without a significant interfering effect by the "blanked" display screen. In some embodiments, this can involve providing a white screen, such as in the case of a multi-layer display having stacked LCD screens, where a white screen on one LCD screen would result in an effective pass-through of whatever is being displayed on the other display screen or screens in the multi-layer stack of screens. In some embodiments, such a "blanking" of a given display screen may be accomplished simply by turning or toggling that display screen to an off position, particularly where the resting state of such a screen is transparent or substantially transparent.

In various embodiments, a "substantially blank" display on a blanked display screen may involve a predominantly clear, white, bright or otherwise transparent display or image, such that the images and texts of the other display screens in the multi-layer display device can be more readily viewed. Such a substantially blank display might be obtained, for example, by providing a general image using only white, off-white, light grey and/or other bright colors. In this manner, a generally bright and transparent background image may be perceived on the substantially blank display screen, while the more pertinent BIOS or VESA display of another display screen in the multi-layer display would be more prominent and readily visible. As one illustrative and non-limiting example, a bright image of a partly cloudy sky using all white, off-white, light grey, light blue and other bright colors might be used as a substantially blank display. As another illustrative example, a bright or light greyscaled image of a corporate logo or trademark might serve as a substantially blank display for purposes of the present invention. Such a display or image can be a stored image that is provided to the affected display screen during a screen blanking process, as described herein.

Detection of a particular video or display mode can be made by way of detecting a particular screen resolution or refresh rate. For example, screen blanking criteria can exist for specific display resolutions that are detected at 640×480 pixels, 720×400 pixels, 800×600 pixels and/or 1280×1024 pixels. As another example, screen blanking criteria can exist for a specific refresh rate that is not about 60 Hz. As is generally known, many video signals and other display signals are sent at a refresh rate of about 60 Hz. In the event that a provided display signal has a refresh rate that is not at or about 60 Hz, then such an event can constitute a screen blanking criteria, if desired. In various embodiments, it is thought that a refresh rate outside the range of about 55 to 65 Hz could result in the determination that a screen blanking criteria exists. Other specific resolutions or refresh rates may also be included, such as in a table or chart that is embedded within device firmware.

As another possibility, a screen blanking condition or criteria can be met for any screen resolution that is not a given resolution, or for any refresh rate that is lower than a given amount. Such an embodiment could take into account other video modes that are relatively "crude" and thus less likely to be intended for use on a sophisticated and coordinated multi-layer display presentation. As one particular example, virtually any video or display modes that have a resolution of 800×600 pixels or lower, or that have a refresh rate that is less than about 60 Hz, are not likely to be intended for use on a multi-layer display (i.e., the display to be used and coordinated with other displays simultaneously). Accordingly, a condition can be set that any display resolution at or below a set resolution or any refresh rate at or below a set rate would result in the detection of screen blanking criteria.

In various embodiments, it may be desirable to detect multiple screen blanking criteria before automatically blanking out one or more display screens. For example, at a detected resolution of 800×600 pixels, the refresh rates may still vary. If the refresh rate is not about 60 Hz, then the display signal may be a boot or start-up signal. However, if the refresh rate is about 60 Hz, then the display signal may be a (relatively crude) video data signal that is intended for use on a multi-layer display presentation. Thus, the display signal analyzer 414 can be configured to determine that if the resolution is equal to 800×600 pixels, then a further analysis may also be required to determine the refresh rate. A screen blanking condition might only exist then where the display resolution and refresh rate meet particular screen blanking criteria. Of course, other resolutions and refresh rates can be used, and it may be desired to facilitate a screen blanking regardless of refresh rates for certain display resolutions, while checking a refresh rate or other secondary parameter for other certain display resolutions.

Figure 5:
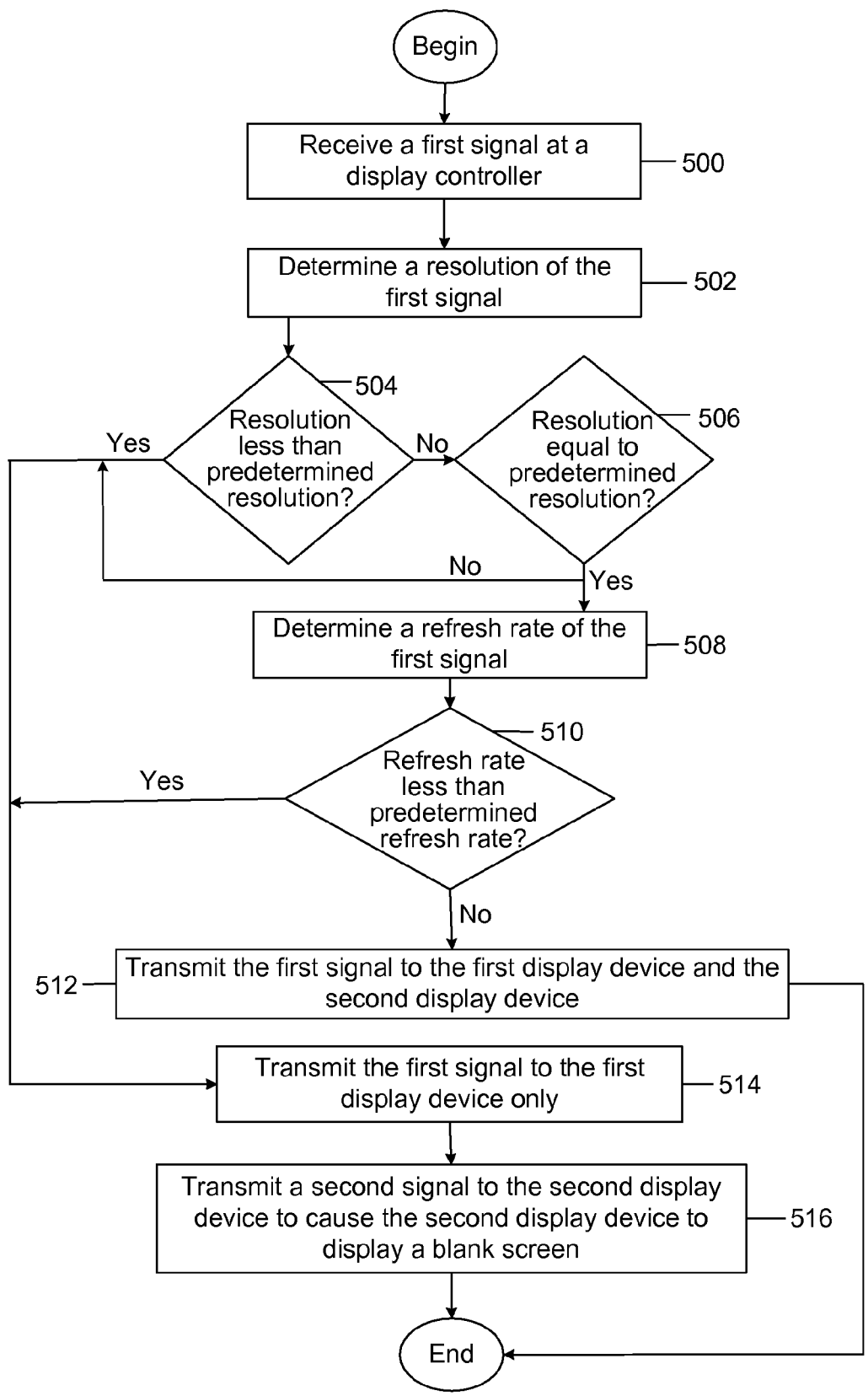
FIG. 5 illustrates a flowchart of one exemplary method for automatically blanking a display screen from a multi-layer display according to one embodiment of the present invention.

FIG. 5 illustrates a flowchart of one exemplary method for automatically blanking a display screen from a multi-layer display according to one embodiment of the present invention. It will be readily appreciated that the method and illustrative flowchart provided herein are merely exemplary, and that the present invention may be practiced in a wide variety of suitable ways. While the provided flowchart may be comprehensive in some respects, it will be readily understood that not every step provided is necessary, that other steps can be included, and that the order of steps might be rearranged as desired by a given manufacturer, as desired. A first signal may be received at the display controller at step 500 from a processor, such as the master gaming controller of a gaming machine, a video processor, or any other programmable logic device. The display controller may determine the resolution of the first signal at step 502 with an analysis application.

At start-up, a user may want to run a DOS, BIOS, and any other application to test, reprogram, reconfigure, or conduct any other analysis on just one screen of a multi-layer display. However, when such programs are initially run, preprogrammed or default displays are typically displayed on all the multi-layer screens, which makes the resulting combined presentation unreadable to the user. Since a boot or start-up application would likely run at a resolution less than 800×600 pixels, an analysis application may determine the resolution of the first signal to determine whether it is a start-up signal or a normal video data signal.

If the resolution is not less than a predetermined resolution, generally 800×600 pixels, at step 504, then the signal may be equal to the predetermined resolution at step 506. The analysis application may then determine the refresh rate of the first signal at step 508. The refresh rate of the first display device may vary based upon the signal received. If the refresh rate is less than about 60 Hz, then it may be a start-up signal as normal display signals generally refresh display devices at a rate of about 60 Hz. Thus, if the refresh rate is greater than the predetermined refresh rate, generally 60 Hz, then the signal is determined to be a normal video signal and transmitted to the first display and the second display devices at step 512.

However if the resolution was less than the predetermined resolution at step 504, or resolution was equal to the predetermined resolution at step 506 but had a refresh rate less than the predetermined refresh rate at step 510, then the display controller may transmit the first data signal to the first display device only at step 514, since the signal may be a start-up signal. The display controller may then transmit a second signal to the second display device or screen to cause the second display screen to display a substantially blank display, such as a white screen, at step 516. Once the second display screen is substantially blanked, such as, for example, by drawing all white in the event of an LCD screen, a user may then be able to view the start-up applications on the first display screen, which might then appear as a conventional single screen display device.

While the foregoing method has been described with respect to specific screen resolutions, refresh rates and a single ("first") display signal for purposes of illustration, it will be readily appreciated that other screen resolutions or refresh rates may be used, and that other screen blanking criteria may also be implemented. Furthermore, multiple display signals may be used in some embodiments, and a similar process of analyzing each such display signal for one or more screen blanking criteria may be implemented. In the event that screen blanking criteria are found in an analyzed display signal, one or more display screens may be blanked accordingly.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A multi-layer display apparatus, comprising:
   a logic device adapted to transmit display signals;
   at least one display controller in communication with and configured to receive at least one display signal from said logic device, said at least one display controller comprising a display signal analyzer configured to analyze the at least one display signal for one or more screen blanking criteria;

a first display screen in communication with said at least one display controller and adapted to present a first graphical display based on the at least one display signal; and a second display screen in communication with said at least one display controller and adapted to present a second graphical display based on the at least one display signal, said second display screen being positioned behind said first display screen such that said first and second graphical displays are adapted to combine for a single visual presentation to a viewer, and wherein said at least one display controller is adapted to facilitate the presentation of a substantially transparent display on said first display screen when a first of the one or more screen blanking criteria is present with respect to the at least one display signal and to facilitate the presentation of a substantially transparent display on said second display screen when a second of the one or more screen blanking criteria is present with respect to the at least one display signal.

2. The multi-layer display apparatus of claim 1, wherein the one or more screen blanking criteria include one or more of a specific display mode, a specific display resolution, and a specific refresh rate detected within the at least one display signal.

3. The multi-layer display apparatus of claim 2, wherein the specific display resolution is selected from the group consisting of 640×480 pixels, 720×400 pixels, 800×600 pixels, and 1280×1024 pixels.

4. The multi-layer display apparatus of claim 2, wherein the specific display mode is selected from the group consisting of DOS, BIOS, and VESA modes.

5. The multi-layer display apparatus of claim 2, wherein the specific refresh rate is not 60 Hz.

6. The multi-layer display apparatus of claim 1, wherein said at least one display controller is adapted to facilitate the presentation of a substantially transparent display on one of said first and second display screens whenever at least two of the one or more screen blanking criteria is present with respect to the at least one display signal.

7. The multi-layer display apparatus of claim 1, wherein said first display screen and said second display screen comprise liquid crystal display screens.

8. The multi-layer display apparatus of claim 1, further comprising:

a third display screen in communication with said at least on display controller and adapted to present a third graphical display based on the at least one display signal, said third display screen being positioned between said first display screen and said second display screen such that said first, second and third graphical displays are adapted to combine for a single visual presentation to a viewer.

9. The multi-layer display apparatus of claim 8, wherein said at least one display controller is adapted to facilitate the presentation of a substantially transparent display on said third display screen whenever one of the one or more screen blanking criteria is present with respect to the at least one display signal.

10. The multi-layer display apparatus of claim 1, wherein said at least one display controller is configured to receive a plurality of display signals including a first display signal and a second display signal, and wherein said first display screen is configured to present the first graphical display based on the first display signal, said second display screen is configured to present the second graphical display based on the second display signal.

11. The multi-layer display apparatus of claim 1, wherein the at least one display signal includes a plurality of displayable portions including a first displayable portion and a second displayable portion, said at least one display controller is configured to split the at least one display signal into the first displayable portion and the second displayable portion, said first display screen is configured to present the first graphical display based on the first displayable portion and said second display screen is configured to present the second graphical display based on the second displayable portion.

12. A method of making a visual presentation to a viewer of a multi-layer display device, said method comprising:

selecting a first display screen and a second display screen, wherein each of the first and second display screens are adapted to present a separate graphical display to a viewer;

positioning the second display screen behind the first display screen such that the separate graphical displays are adapted to combine for a single visual presentation to the viewer;

receiving at least one display signal at a display controller, wherein the display controller is electrically coupled to the first and second display screens;

analyzing the at least one display signal for one or more screen blanking criteria at the display controller;

when a first of the one or more screen blanking criteria is present with respect to the at least one display signal, presenting a first display based on the at least a portion of the at least one display signal at the first display screen and displaying a substantially transparent display on the second display screen; and when a second of the one or more screen blanking criteria is present with respect to the at least one display signal, presenting a second display based on the at least a portion of the at least one display signal at the second display screen and displaying a substantially transparent display on the first display screen.

13. The method of claim 12, wherein the one or more screen blanking criteria include one or more of a specific display mode, a specific display resolution, and a specific refresh rate detected within the at least one display signal.

14. The method of claim 13, wherein the specific display resolution is selected from the group consisting of 640×480 pixels, 720×400 pixels, 800×600 pixels, and 1280×1024 pixels.

15. The method of claim 13, wherein the specific display mode is selected from the group consisting of DOS, BIOS, and VESA modes.

16. The method of claim 13, wherein the specific refresh rate is not 60 Hz.

17. An apparatus to automatically blank one display screen within a multi-layer display device, said apparatus comprising:

means for receiving at least one display signal;

means for analyzing the at least one display signal for one or more screen blanking criteria;

means for transmitting at least a portion of the at least one display signal to one of a first display screen and a second display screen within the multi-layer display device, wherein the first and second display screens are positioned front-to-back such that respective first and second graphical displays of the first and second display screens are adapted to combine for a single visual presentation to a viewer; and means for automatically displaying a substantially transparent display on one of the first display screen and the second display screen of the multi-layer display device, such that when a first of the one or more screen blanking criteria has been analyzed to be present with respect to the at least one display signal, the first display screen displays the substantially transparent display and the second display screen displays the second graphical display, and when a second of the one or more screen blanking criteria is present with respect to the at least one display signal, the second display screen displays the substantially transparent display and the first display screen displays the first graphical display.

18. The apparatus of claim 17, wherein the one or more screen blanking criteria include one or more of a specific display mode, a specific display resolution, and a specific refresh rate detected within the at least one display signal.

19. A gaming machine adapted to accept a wager, administer a game based on the wager, and award a monetary prize based upon the outcome of the game, said gaming machine comprising:
- a cabinet defining an interior region of said gaming machine, said cabinet adapted to house a plurality of gaming machine components within said interior region;
- a first display device, disposed within said interior region, configured to output a visual image in response to a control signal;
- a second display device, arranged relative to said first display device such that a common line of sight passes through a portion of said first display device to a portion of said second display device;
- at least one logic device configured to execute instructions to transmit display signals adapted to for display on each of said first display device and said second display device; and
- at least one display controller in communication with said at least one logic device, said first display device, and said second display device and configured to transmit the display signals from said at least one logic device to said first display device and said second display device, said at least one display controller comprising a signal analyzer configured to analyze the display signals for one or more screen blanking criteria, and wherein said at least one display controller is adapted to facilitate the presentation of a substantially transparent display on said first display device when a first of the one or more screen blanking criteria is present with respect to the display signals and to facilitate the presentation of a substantially transparent display on said second display device when a second of the one or more screen blanking criteria is present with respect to the display signals.

20. The gaming machine of claim 19, wherein the one or more screen blanking criteria include one or more of a specific display mode, a specific display resolution, and a specific refresh rate detected within the at least one display signal.

21. A gaming system adapted to accept wagers, administer games based on the wagers, and award monetary prizes based upon the outcomes of the games, said gaming system comprising:
- a plurality of processor-based gaming machines, each processor-based gaming machine having a cabinet defining an interior region, a first display device disposed within said interior region and configured to output a visual image in response to a control signal, a second display device arranged relative to said first display device such that a common line of sight passes through a portion of said first display device to a portion of said second display device, a logic device configured to execute instructions to transmit display signals adapted for display on each of said first and second display devices, and a display controller in communication with said logic device, said first display device, and said second display device and configured to transmit the display signals from said logic device to said first display device and said second display device;
- a remote host in communication with each of said plurality of processor-based gaming machines, said remote host being adapted to provide one or more of the display signals to each of said plurality of processor-based gaming machines; and
- at least one display signal analyzer configured to analyze the display signals for one or more screen blanking criteria, said at least one display signal analyzer adapted to communicate the presence of the one or more screen blanking criteria to said plurality of processor-based gaming machines, and wherein said display controller of each of said processor-based gaming machines is adapted to facilitate the presentation of a substantially transparent display on said first display device of its respective gaming machine when a first of the one or more screen blanking criteria is present with respect to the display signals being transmitted to its respective gaming machine and to facilitate the presentation of a substantially transparent display on said second display device of its respective gaming machine when a second of the one or more screen blanking criteria is present with respect to the display signals being transmitted to its respective gaming machine.

22. The gaming system of claim 21, wherein the one or more screen blanking criteria include one or more of a specific display mode, a specific display resolution, and a specific refresh rate detected within the at least one display signal.

23. The gaming system of claim 21, wherein said at least one signal analyzer is located remotely from one or more of said plurality of processor-based gaming machines.

24. The gaming system of claim 21, wherein said at least one display signal analyzer comprises a plurality of display signal analyzers located within two or more of said plurality of processor-based gaming machines.

* * * * *